(12) United States Patent
Poluri et al.

(10) Patent No.: US 11,687,059 B2
(45) Date of Patent: Jun. 27, 2023

(54) APPLICATION WITH FLEXIBLE CONTROL LOOPS FOR PROGRAMMING A BUILDING CONTROLLER

(71) Applicant: HONEYWELL INTERNATIONAL INC., Charlotte, NC (US)

(72) Inventors: Nagasree Poluri, Charlotte, NC (US); Gutha Stalin Sanghamitra, Charlotte, NC (US); Shriram Sankaran, Charlotte, NC (US); Shreya Ratakonda, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/304,203

(22) Filed: Jun. 16, 2021

(65) Prior Publication Data
US 2021/0397160 A1    Dec. 23, 2021

(30) Foreign Application Priority Data

Jun. 22, 2020    (IN) .............................. 202011026340

(51) Int. Cl.
*G05B 19/4155*    (2006.01)

(52) U.S. Cl.
CPC ................... *G05B 19/4155* (2013.01); *G05B 2219/25011* (2013.01)

(58) Field of Classification Search
CPC ................................................ G05B 19/4155
USPC .......................................................... 700/28
See application file for complete search history.

(56) References Cited

U.S. PATENT DOCUMENTS

| | | | |
|---|---|---|---|
| 7,055,759 B2 | 6/2006 | Wacker et al. | |
| 7,984,420 B2* | 7/2011 | Eldridge | G05B 19/0426 700/86 |
| 9,575,477 B2 | 2/2017 | Blount et al. | |
| 10,514,677 B2 | 12/2019 | Meruva et al. | |
| 2005/0040248 A1* | 2/2005 | Wacker | G05D 23/1905 236/51 |
| 2008/0294291 A1* | 11/2008 | Salsbury | F24F 11/30 700/277 |
| 2009/0088902 A1 | 4/2009 | Williams | |

(Continued)

OTHER PUBLICATIONS

Extended European Search Report, EP Application No. 21178320.4, dated Nov. 22, 2021 (8 pages).

*Primary Examiner* — Mohammad Ali
*Assistant Examiner* — Joshua T Sanders
(74) *Attorney, Agent, or Firm* — Seager, Tufte & Wickhem, LLP

(57) ABSTRACT

A first building equipment to be controlled by a building controller is selected via a user interface from a plurality of predefined building equipment options and a first control loop for controlling the first building equipment is defined via the user interface by selecting from a plurality of predefined first control loop parameter options and one or more terminals of the building controller are assigned to the first control loop. A second building equipment to be controlled by the building controller is selected via the user interface from the plurality of predefined building equipment options and a second control loop for controlling the second building equipment is defined via the user interface by selecting from a plurality of predefined second control loop parameter options. One or more terminals of the building controller are assigned to the second control loop.

17 Claims, 17 Drawing Sheets

(56) References Cited

U.S. PATENT DOCUMENTS

| | | |
|---|---|---|
| 2012/0246590 A1 | 9/2012 | D'Souza et al. |
| 2014/0316581 A1* | 10/2014 | Fadell ................... F24F 11/30 700/276 |
| 2017/0017231 A1* | 1/2017 | Toyota ................ G05B 19/042 |
| 2017/0292729 A1* | 10/2017 | Schuler ................ G05B 15/02 |
| 2018/0012173 A1 | 1/2018 | Leen et al. |
| 2018/0087796 A1 | 3/2018 | Blair et al. |
| 2019/0087076 A1 | 3/2019 | Dey et al. |
| 2019/0310836 A1 | 10/2019 | Reichl |
| 2020/0041154 A1 | 2/2020 | Ribbich et al. |

* cited by examiner

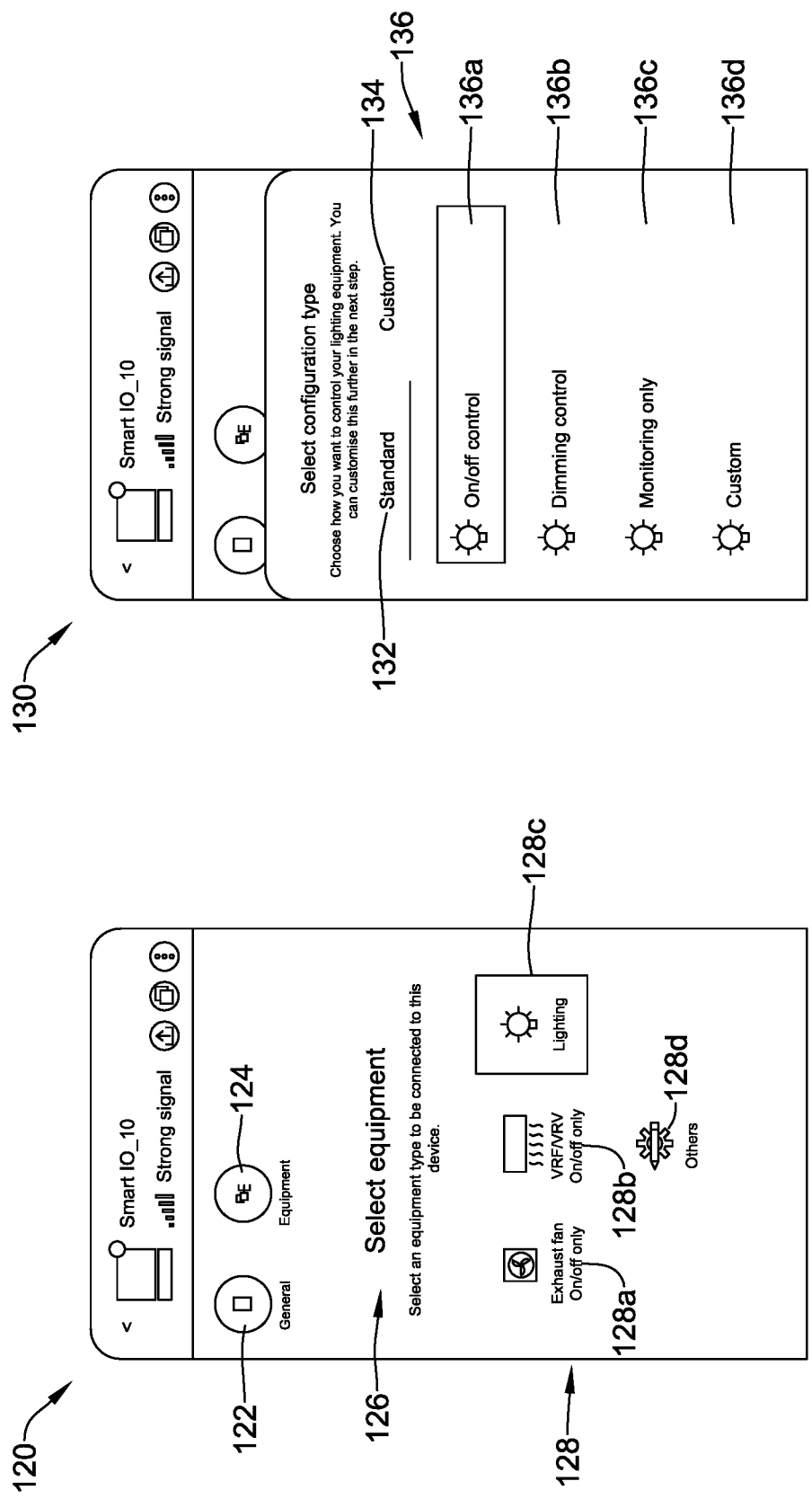

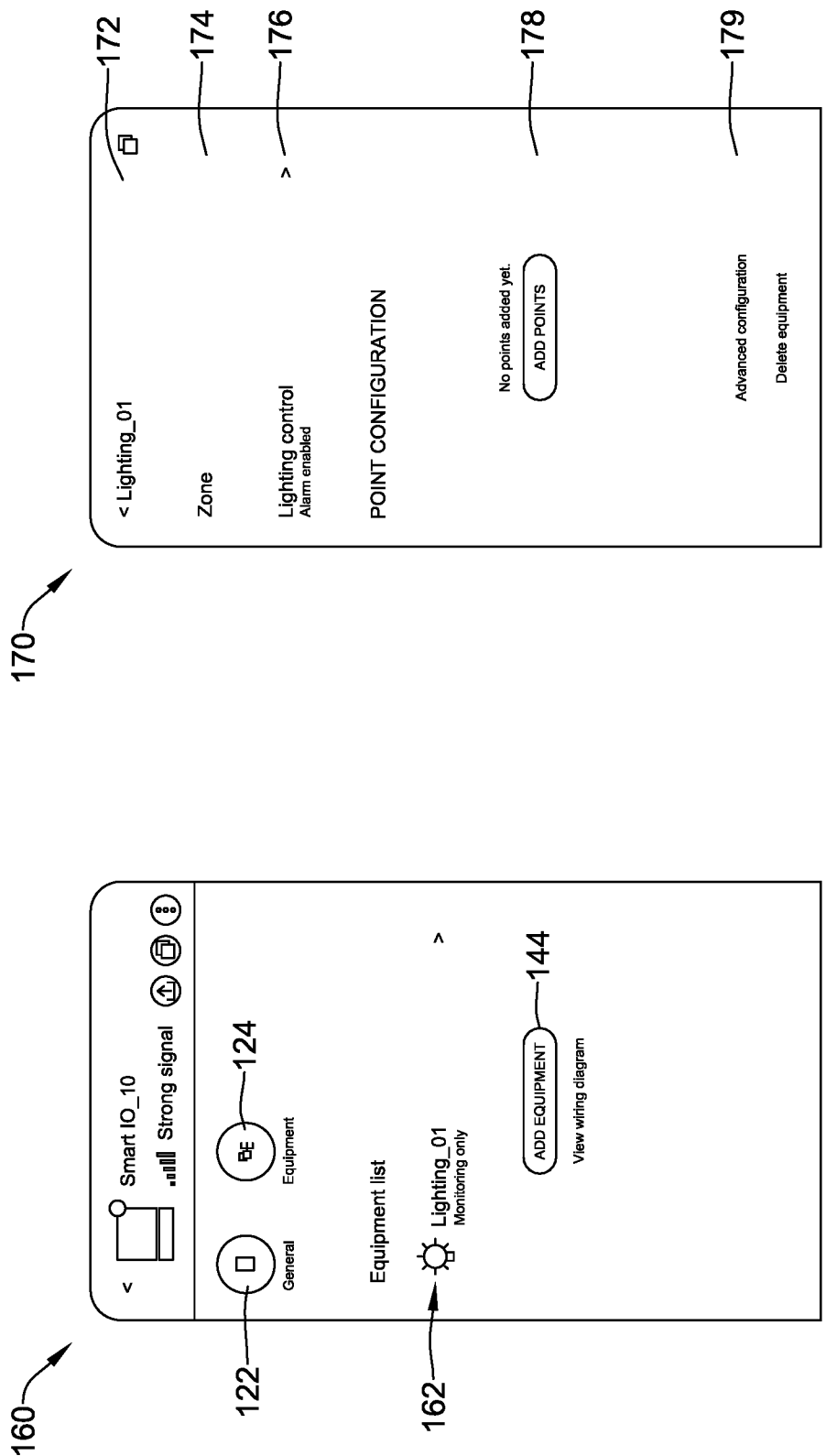

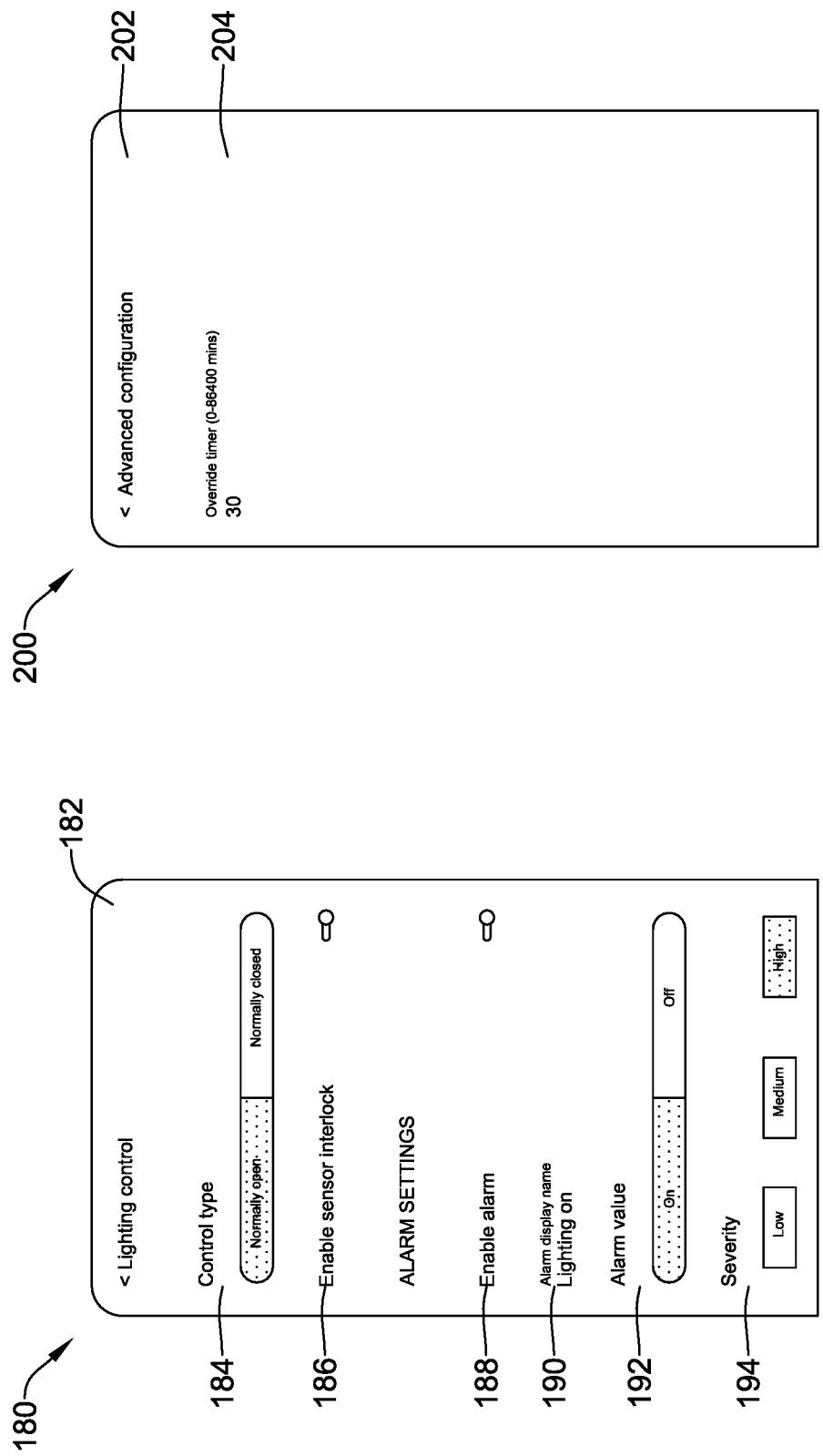

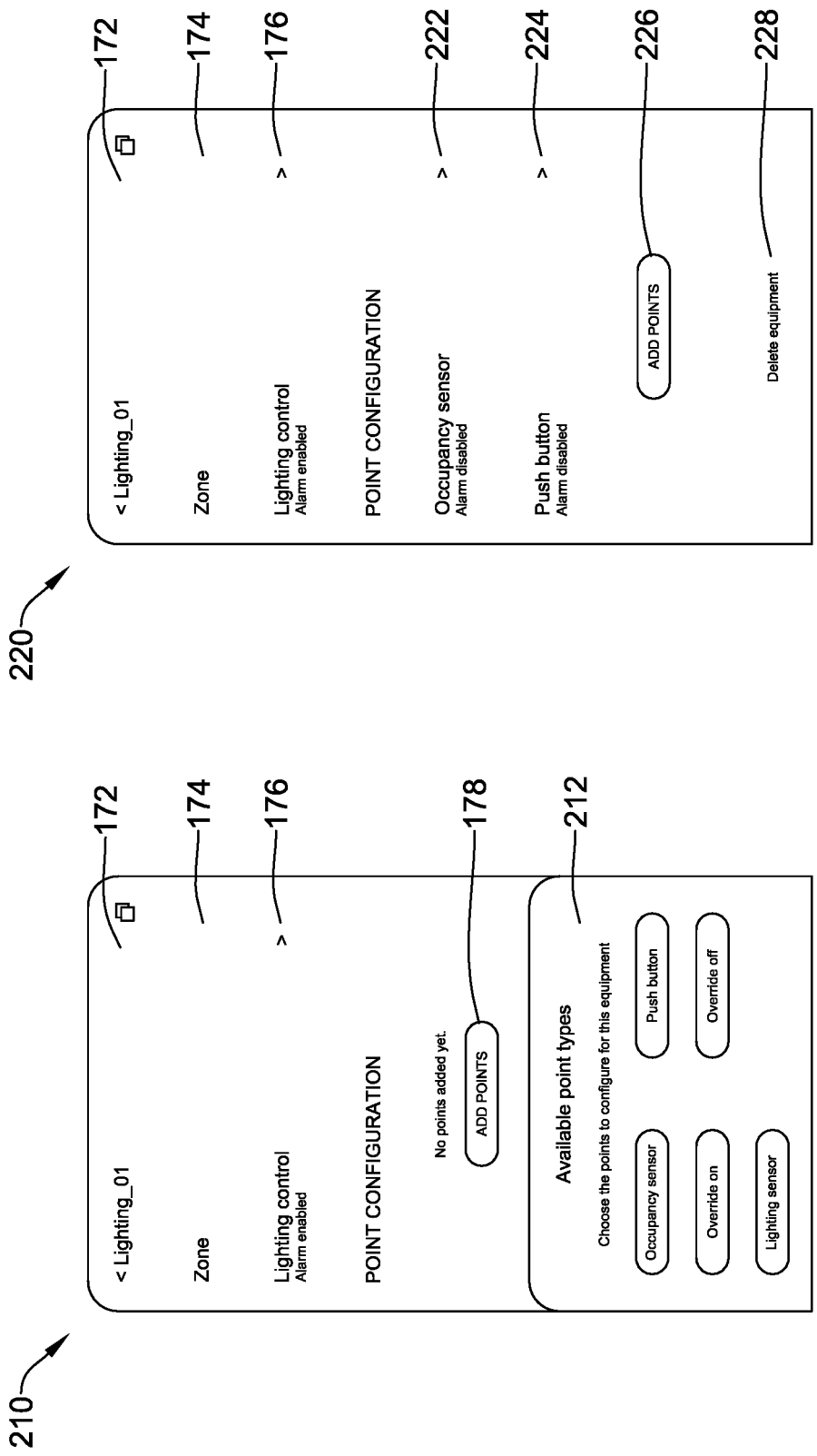

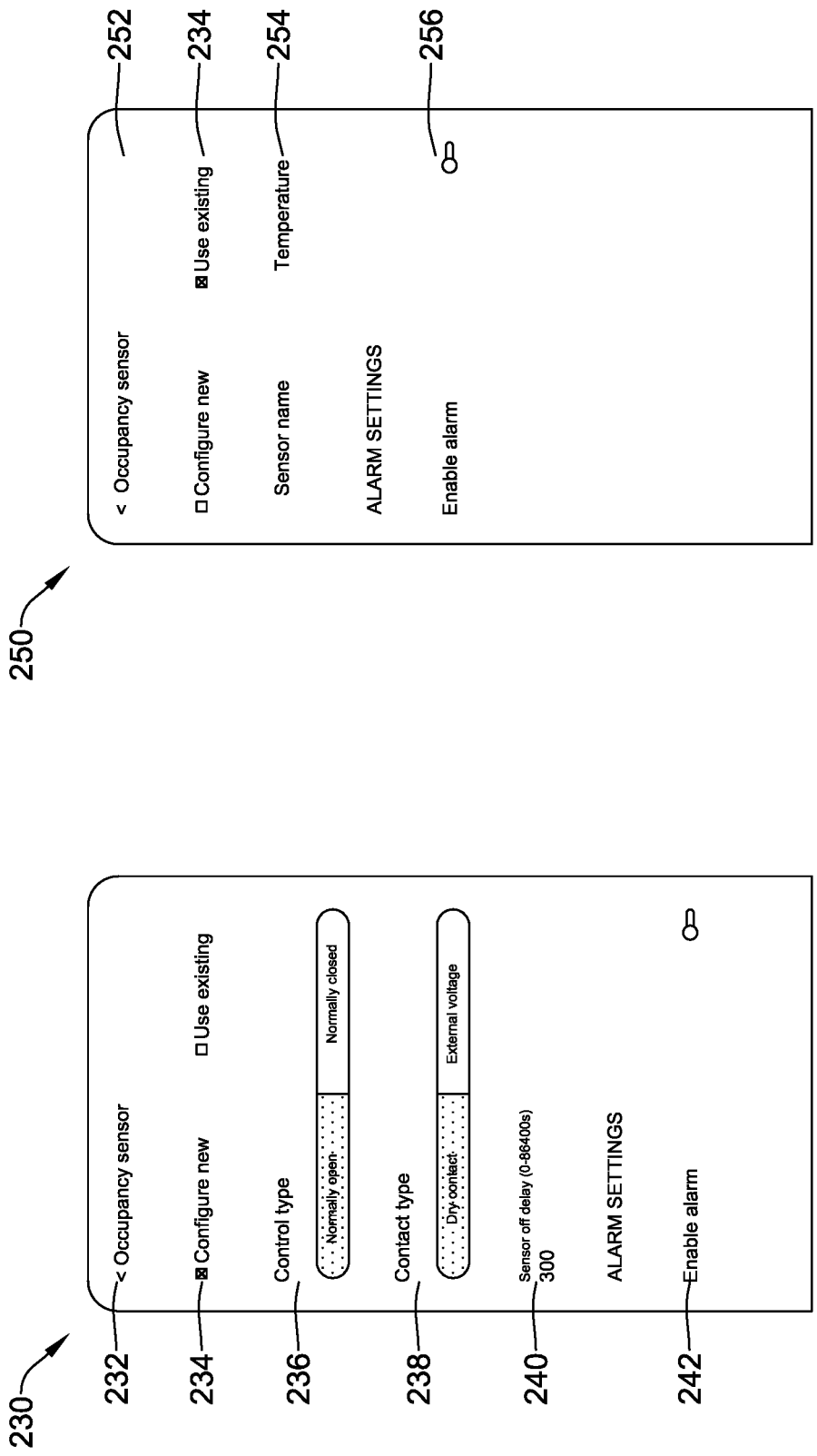

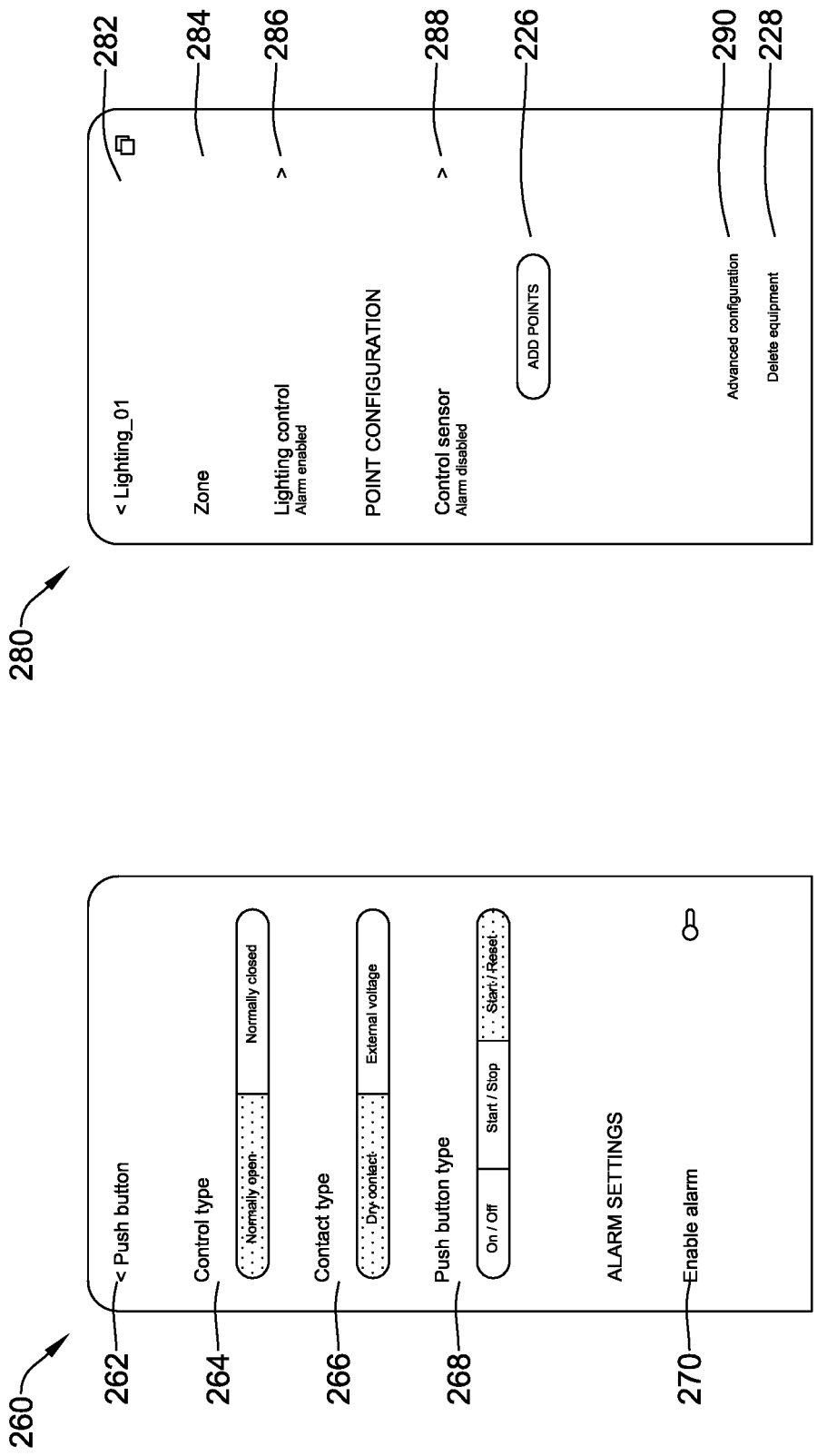

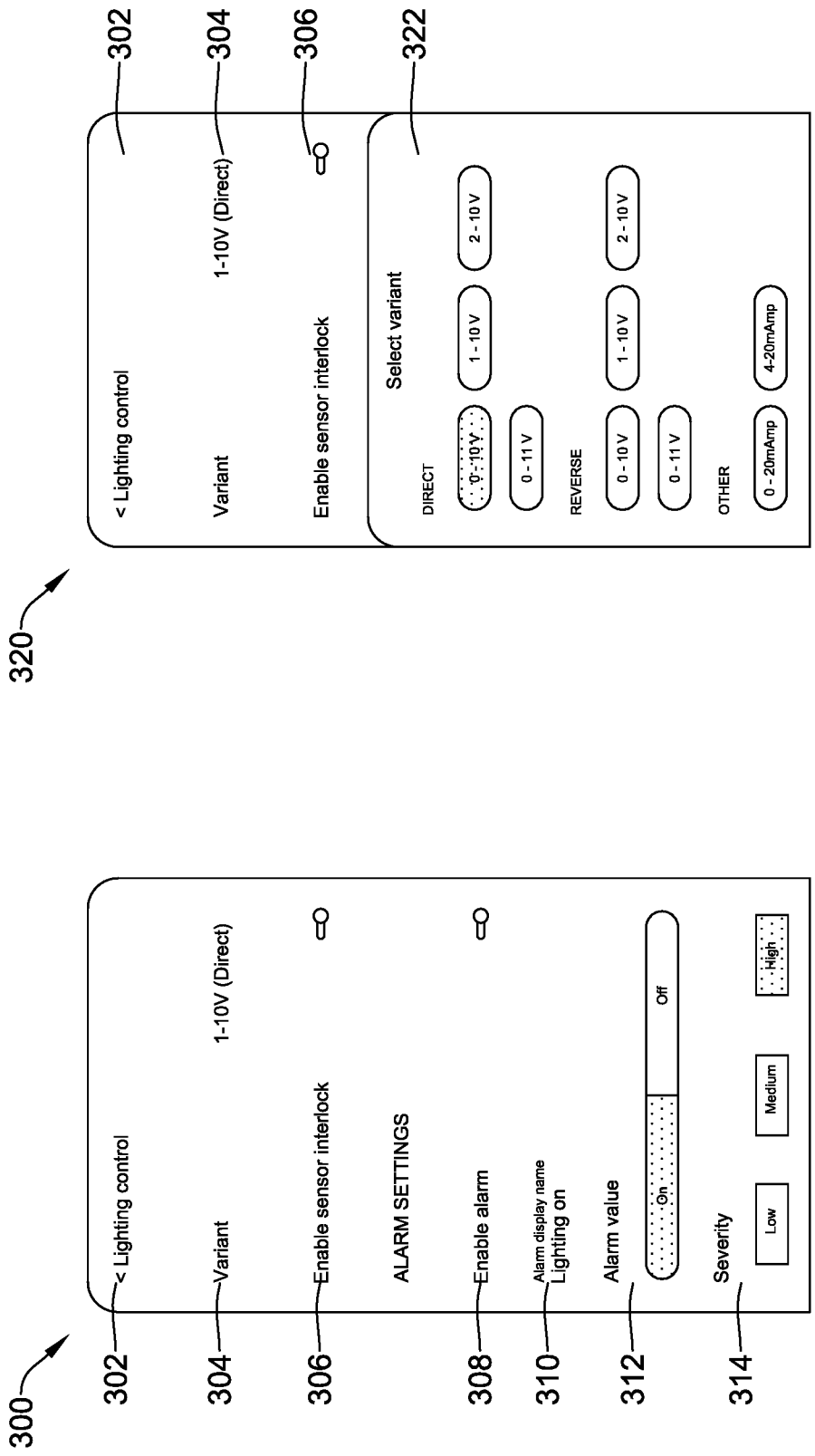

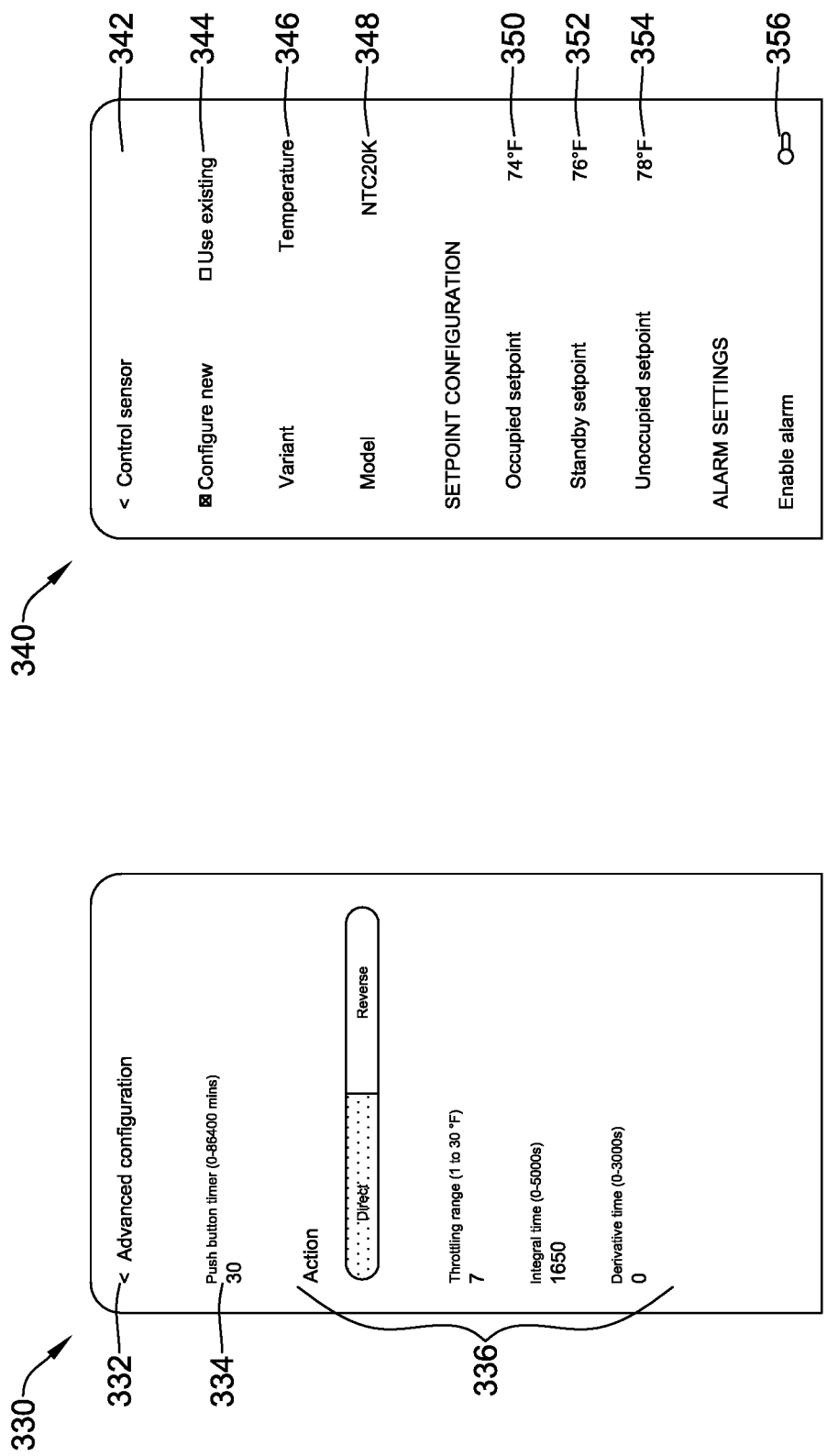

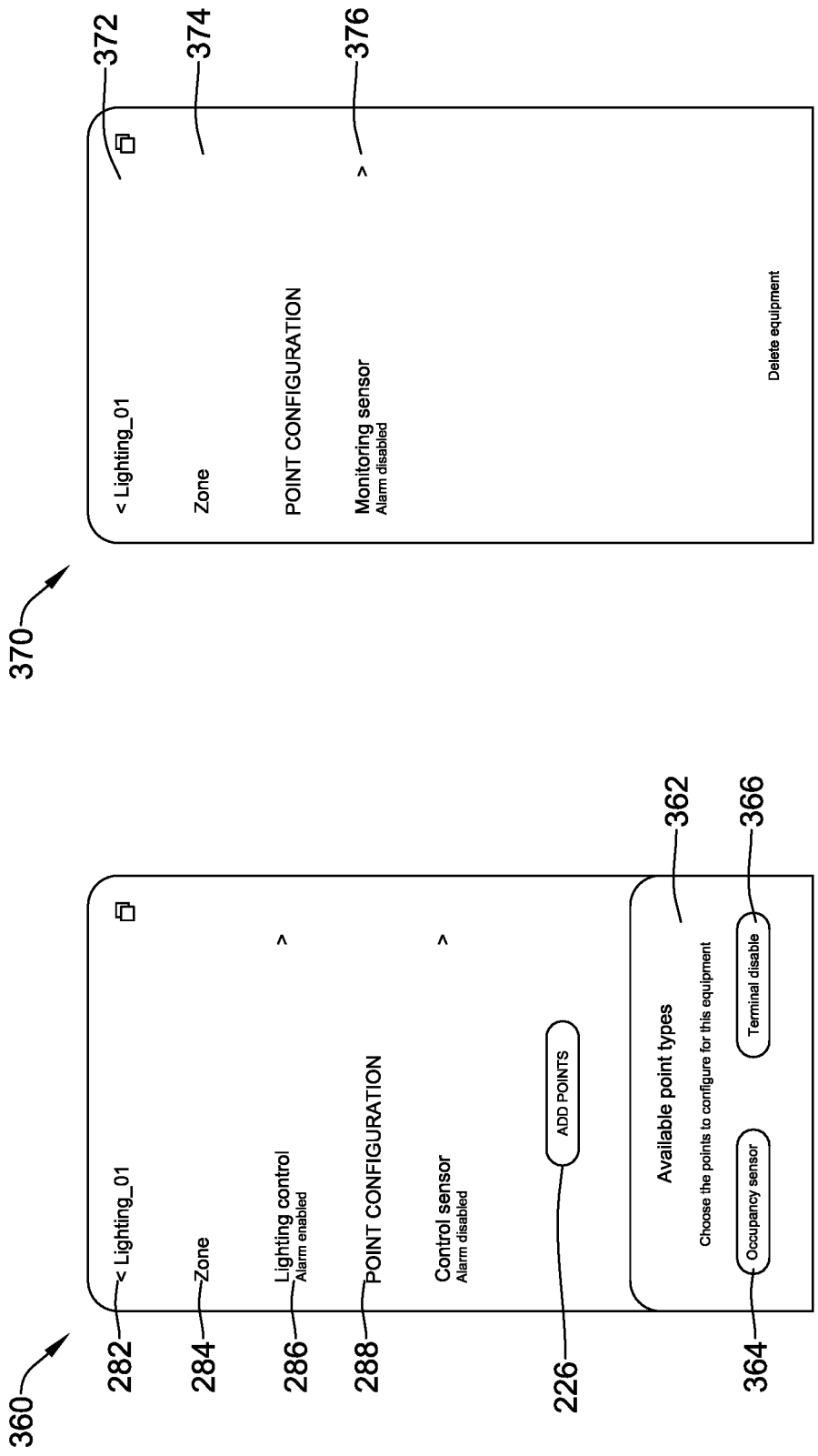

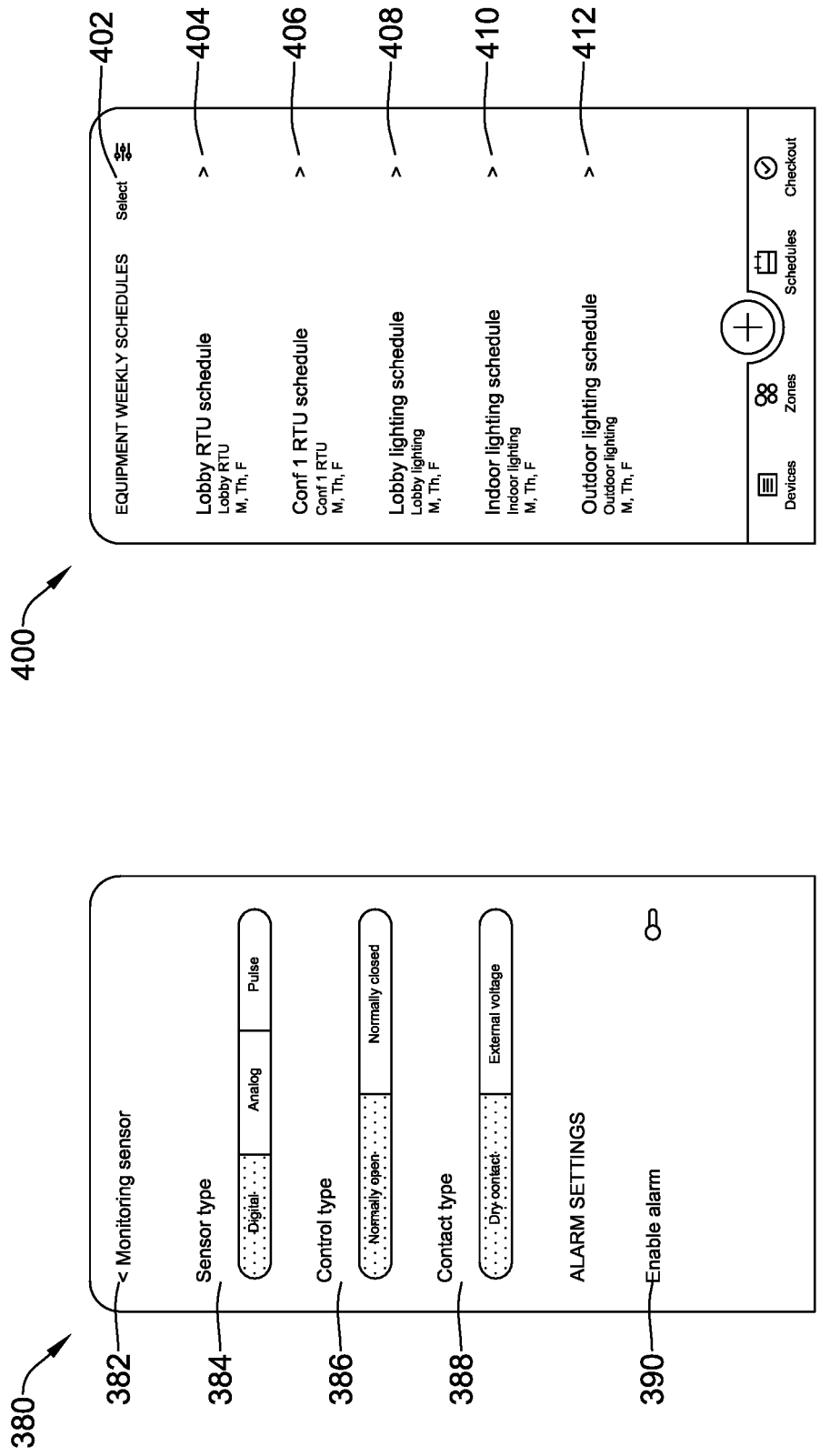

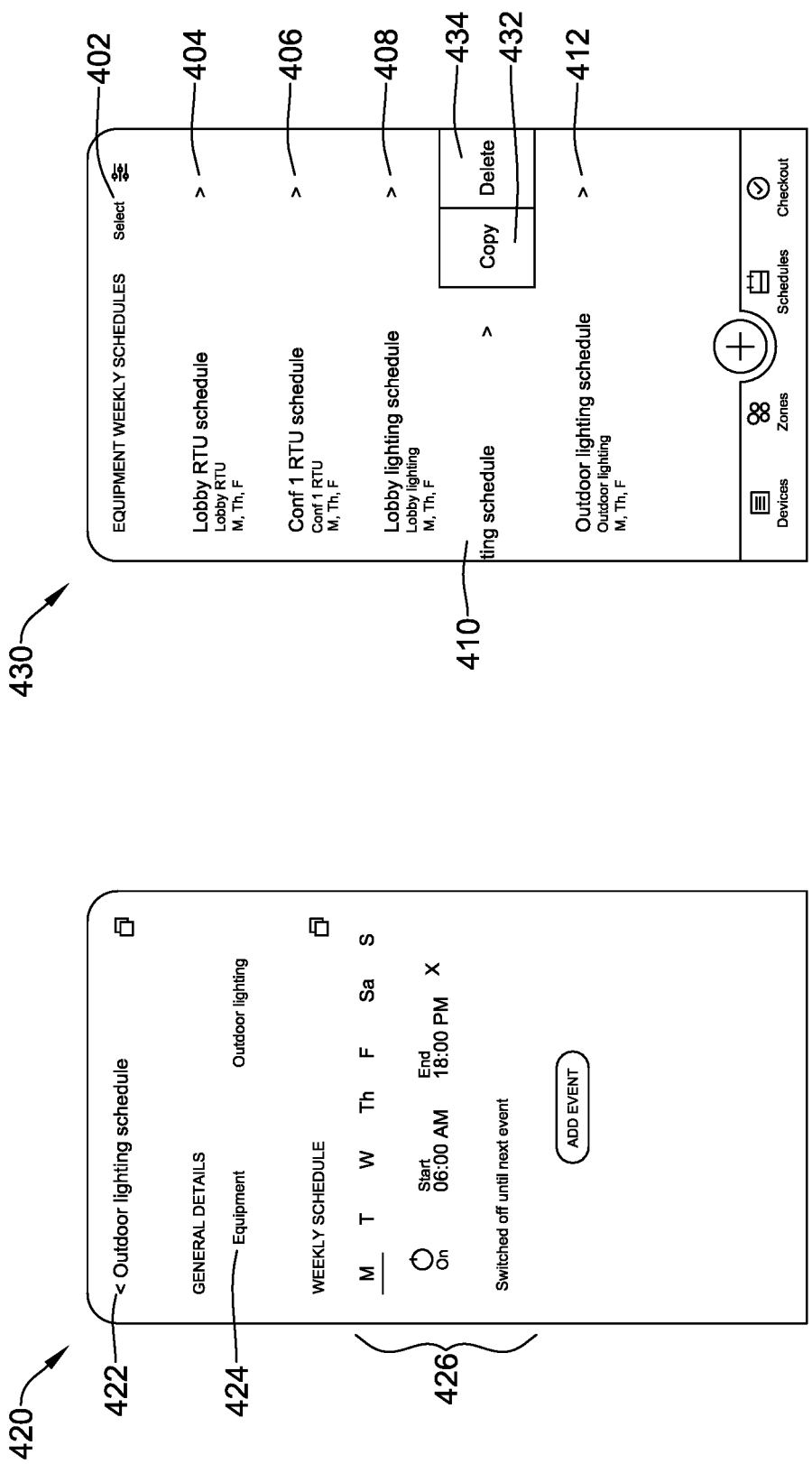

APPLICATION WITH FLEXIBLE CONTROL LOOPS FOR PROGRAMMING A BUILDING CONTROLLER

CROSS-REFERENCE TO RELATED APPLICATIONS

This application claims priority pursuant to 35 U.S.C. 119(a) of India Patent Application No. 202011026340, filed Jun. 22, 2020, which application is incorporated herein by reference in its entirety.

TECHNICAL FIELD

The present disclosure relates generally to building controllers, and more particularly to programming building controllers for use in small and medium business.

BACKGROUND

Building controllers are used to control a variety of different building components, such as but not limited to Heating, Ventilating and Air Conditioning (HVAC) systems, security systems, lighting systems and the like. While building controllers can be configured to control any of a variety of different building equipment, programming such building controllers can require complicated configuration tools that often require specially trained professionals that understand the configuration tools and have the knowledge to build the desired programming and control logic. While this is acceptable for configuring large buildings with complicated building management systems, small and medium sized buildings cannot afford such an approach. What would be a desirable is an intuitive, easy to use way to program a building controller for use in a small and medium sized business.

SUMMARY

The present disclosure relates generally to programming a building controller to be able to control any of a variety of different building components. In an example, a building controller is programmed to control building equipment of a building, where the building controller has a plurality of terminals. A first building equipment to be controlled by the building controller is selected via a user interface from a plurality of predefined building equipment options. A first control loop for controlling the first building equipment is defined via the user interface by selecting from a plurality of predefined first control loop parameter options. One or more of the plurality of terminals of the building controller are assigned to the first control loop based at least in part on which of the plurality of predefined first control loop parameter options were selected. A second building equipment to be controlled by the building controller is selected via the user interface from the plurality of predefined building equipment options. A second control loop for controlling the second building equipment is defined via the user interface by selecting from a plurality of predefined second control loop parameter options. One or more of the plurality of terminals of the building controller are assigned to the second control loop based at least in part on which of the plurality of predefined second control loop parameter options were selected.

In another example, a non-transient, computer-readable storage medium has instructed stored on the storage medium. When the instructions are executed by one or more processors of a mobile device, the one or more processors of the mobile device are caused to accept a selection via a user interface of the mobile device a first building equipment to be controlled by a building controller from a plurality of predefined building equipment options. The one or more processors are caused to accept input via the user interface of the mobile device that defines a first control loop for controlling the first building equipment by selecting from a plurality of predefined first control loop parameter options. The one or more processors are caused to accept a selection via the user interface of the mobile device a second building equipment to be controlled by the building controller from the plurality of predefined building equipment options. The one or more processors are caused to accept input via the user interface of the mobile device that defines a second control loop for controlling the second building equipment by selecting from a plurality of predefined second control loop parameter options. The one or more processors are caused to output the defined first control loop and the defined second control loop for execution on the building controller, such that the building controller controls the first building equipment in accordance with the first control loop and the second building equipment in accordance with the second control loop.

In another example, a method configures a controller application that will execute on a building controller in order to control a building equipment, the controller application when executing causing the building controller to receive one or more inputs from some of a plurality of terminals of the building controller and to create and output one or more outputs via one or more of the other of the plurality of terminals of the building controller, the controller application customizable to execute on any of a variety of different building controllers and/or to control any of a variety of different building equipment. A user is allowed to specify a piece of building equipment using a mobile device application and a determination is made as to whether the specified piece of building equipment will require a control loop or a monitoring loop. When it is determined that the specified piece of building equipment will require a control loop, the mobile device application solicits from the user input as to whether an output type is analog or digital, and based on the selection, the mobile device application solicits from the user input as to one or more of the corresponding control loop's output, input and loop parameter configuration. When it is determined that the specified piece of building equipment will require a monitoring loop, the mobile device application solicits from the user input as to an input configuration for the monitoring loop. In either case, the mobile device application automatically generates IO terminal assignments for the building controller. The mobile device application converts the configuration into a controller-understandable format and downloading the controller-understandable format for execution on the building controller.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
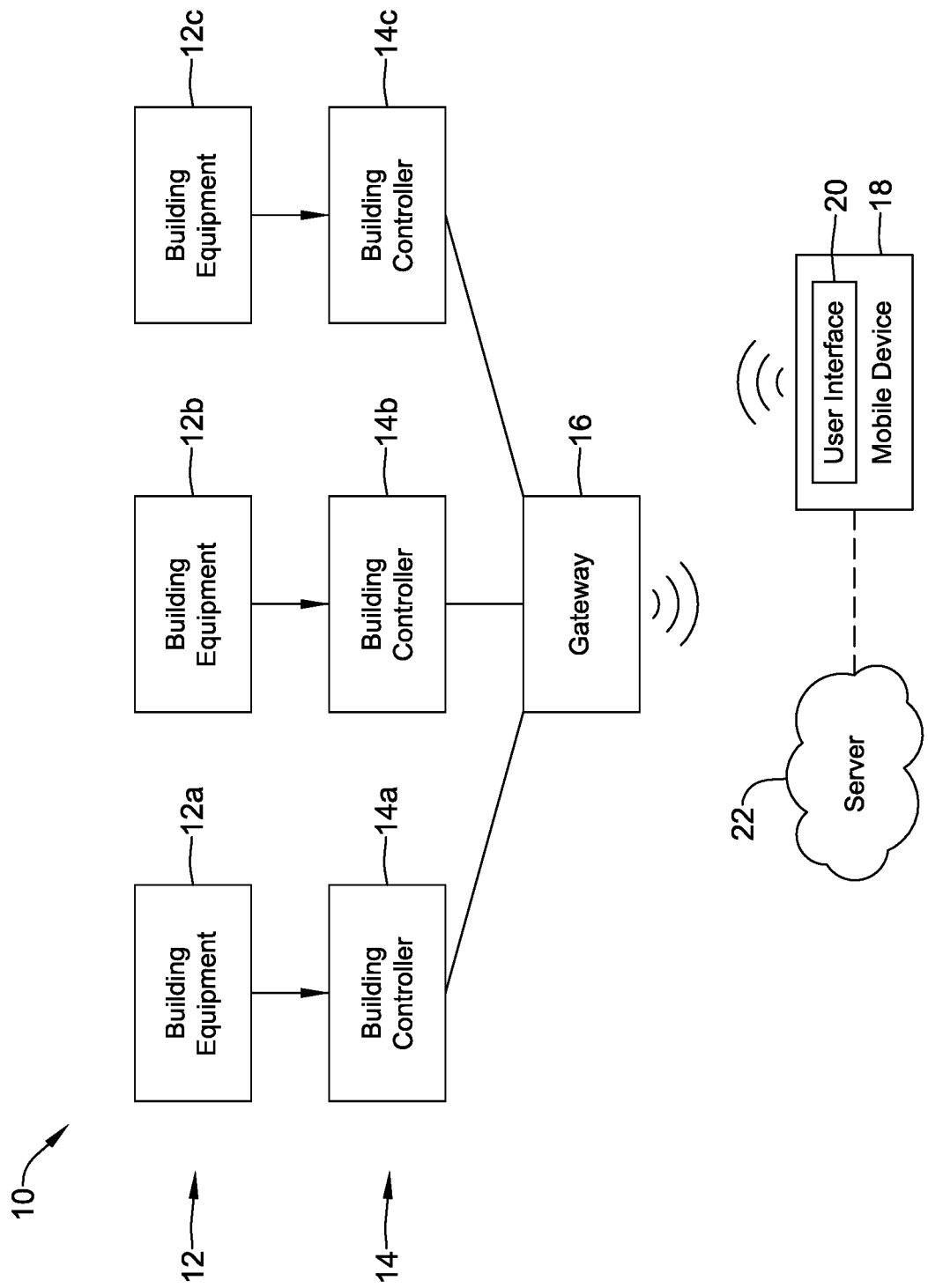
FIG. 1 is a schematic block diagram of an illustrative building system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building system 10. It will be appreciated that the building system 10 may represent any of a variety of different types of building systems. For example, the building system 10 may represent a Heating, Ventilating and Air Conditioning (HVAC) system. The building system 10 may represent a lighting system, or perhaps a security system. In some instances, the illustrative building system 10 may be considered as being applicable to deployment within a small to medium sized building. The illustrative building system 10 may be considered as being applicable to use in a small business, such as but not limited to a coffee shop, a restaurant, an individually owned retail establishment, and the like.

The building system 10 includes a number of building equipment components 12, individually labeled as 12a, 12b, 12c. It will be appreciated that this is merely illustrative, as the building system 10 may have any number of building equipment components 12, and may have a large number of building equipment components 12. The building equipment components 12 may represent any of a variety of different types of building equipment. If the building system 10 includes an HVAC system, some or all of the building equipment components 12 may represent HVAC components such as Air Handling Units (AHU), Roof Top Units (RTU), temperature sensors and the like. If the building system 10 includes a lighting system, some or all of the building equipment components 12 may represent lighting components. If the building system 10 includes a security system, some or all of the building equipment components 12 may represent security components. These are just examples.

The illustrative building system 10 includes a number of building controllers 14, individually labeled as 14a, 14b, 14c. While there are three building controllers 14 illustrated, with a one to one relationship between each of the building equipment components 12 and the corresponding building controller 14, this is not required in all cases. For example, there may be simple building equipment components 12 that do not require an entire building controller 14 to operate. In some instances, a single building controller 14 may control two or more separate building equipment components 12, event of varying types (e.g. an RTU and a light). In the example shown, each of the building controllers 14 are in communication with a gateway 16. The gateway 16 may provide the building controllers 14 with access to a network beyond that of the building that the building system 10 is deployed in. In some cases, as will be discussed, the gateway 16 may a communication path to help configure each of the building controllers 14.

In some cases, a mobile device 18 may be used to configure each of the building controllers 14. The mobile device 18 has a user interface 20. The mobile device 18 may, for example, be a tablet computer, a smart phone or a lap-top computer. A user may use an application executing on the mobile device 18 to configure each of the building controllers 14. The user interface 20 may be used to solicit information from the user, and to accept inputs from the user. In some instances, an application executing on the mobile device 18 walks the user through configuring a building application for use in operating one of the building controllers 14 in an intuitive, easy to follow step-by-step process that can be easily completed by someone who has some understanding of the building equipment components 12 and their corresponding building controllers 14.

Once the application executing on the mobile device 18 has completed configuring a building application, the mobile device 18 may communicate with the gateway 16 in order to supply the configured building application to the corresponding building controller 14. Alternatively, the mobile device 18 may communicate with the corresponding building controllers directly in order to supply the configured building application. The building controller 14 will then execute the configured building application in order to properly manage operation of the corresponding building equipment component 12. In some cases, the mobile device 18 may be in communication with a cloud-based server 22, and at least some of the work of actually configuring the building application for execution by a particular one of the building controllers 14 may occur within the cloud-based server 22. In some instances, the user interface 20 of the mobile device 18 may be used to solicit inputs from a user, and the inputs provided by the user may be communicated to the cloud-based server 22. In some cases, the questions being asked of the user may also come from the cloud-based server 22. It will be appreciated that the cloud-based server 22 may represent a single computer server, or may be a server farm, for example. In some cases, rather than using a mobile device 18, the user may use an application running on or accessible via a desktop computer, a console communicating with the server 22, or some other non-mobile device.

Figure 2:
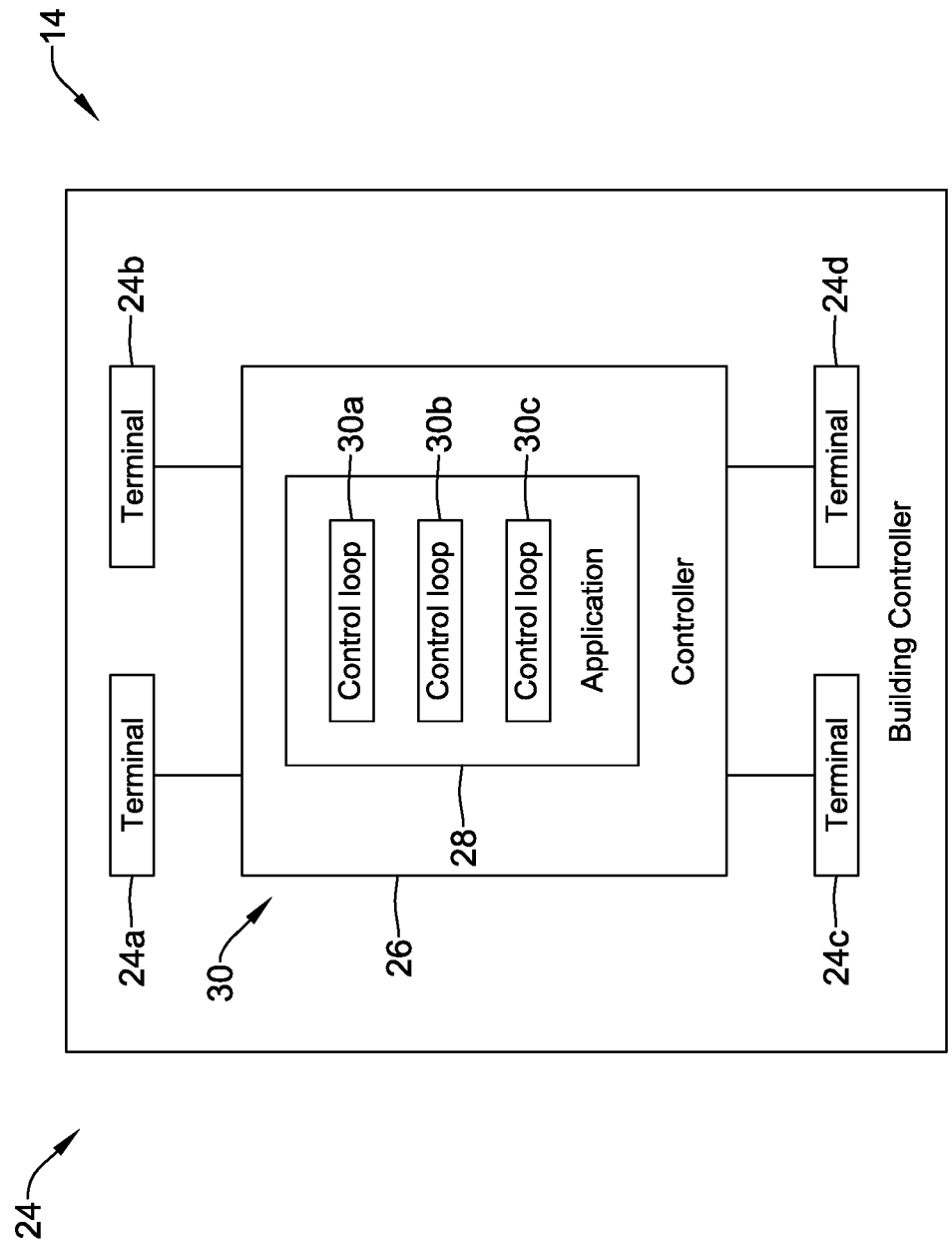
FIG. 2 is a schematic block diagram of an illustrative building controller usable in the illustrative building system of FIG. 1.

FIG. 2 is a schematic block diagram of one of the building controllers 14. The building controller 14 includes a number of terminals 24, individually labeled as 24a, 24b, 24c, 24d. While a total of four terminals 24 are shown, it will be appreciated that this is merely illustrative, as the building controller 14 may have any number of terminals 24. The building controller 14 may have a variety of different types of terminals 24. For example, the building controller 14 may include one or more universal IO (UIO) terminals that can be configured to be any of an analog input terminal, a digital input terminal, an analog output terminal and a digital output terminal. The building controller 14 may include one or more binary input (BI) terminals and one or more binary output (BO) terminals, for example. In some cases, the BI terminals may be labeled as digital input (DI) terminals and the BO terminals may be labeled as digital output (DO) terminals. In one particular example, the building controller 14 may have a total of 10 terminals, including 4 UIO terminals, 2 DI terminals and 4 DI terminals. A total number of possible control loops may be a function of how many terminals are available on the corresponding building controller 14.

Each of the terminals 24 are operably coupled to a controller 26. The controller 26 executes an application 28 that essentially instructs the controller 26 how to handle inputs received from one or more of the terminals 24 and which terminals 24 to provide appropriate outputs to. In some cases, the application 28 may be stored in memory within the controller 26. The application 28 may be considered as being a fixed application, which can simplify configuration. In some cases, the application 28 may include a number of control loops 30, which are individually labeled as 30a, 30b, 30c. It will be appreciated that this is merely illustrative, as the application 28 may utilize any number of control loops 30. In some cases, the number of control loops 30 used within the application 28 may be a function of how many terminals 24 that the building controller 14 has and/or the type of building equipment is to be controlled. In some cases, the control loops 30 may be configured to function as any of a modulating control loop, a floating control loop, a pulse width modulating control loop, a digital control loop, a staging control loop and a monitoring loop.

In some cases, a user selects a type of equipment to control, and in response, what to do with the equipment is exposed as a configuration type such as binary or analog control, or simple monitoring. The application will then solicit an input configuration if simple monitoring is selected. If binary control is selected, the application will display input, output and loop parameters for that respective binary loop. If analog control is selected, the application may prompt for more information, including whether the analog control is modulating, floating, pulse width modulation or staging. Based on the selection, the application may display input, output, loop parameter configuration for the respective loop (such as a floating control loop).

For each controlling loop, there may be an associated schedule that by default will be disabled. The application may prompt the user to indicate whether the equipment is to be controlled by a schedule. If it is configured as yes, the application will automatically map a default schedule for that particular equipment or point. If the schedule is enabled, the application may progressive prompt for schedule setpoints such as occupied setpoints, unoccupied setpoints and standby setpoints, for example.

Modulating, floating and PWM (pulse width modulation) loops may use a sensor value from an input (e.g. a universal input terminal (UIT)) and a setpoint from a configured software point to control the output. In some cases, some or all of the inputs may be received via a wireless port of the building controller (e.g. from a wireless sensor), and some or all of the outputs may be transmitted to building equipment via the wireless port (e.g. wirelessly controllable light switch). In some cases, one or more of the terminals may not be used or even provided.

The control loop can be further disabled by a loop disable point that can be a physical point from a local controller or a network point that comes from another system. An occupancy sensor input may be used to control the output based on a standby setpoint. Sensor types that can be added as inputs can include, for example, occupancy sensors, motion sensors, passive infrared (PIR) sensors, temperature sensors, carbon dioxide sensors, humidity sensors, light sensors, air pressure sensors, VOC (volatile organic compounds) sensors, water level sensors, helium sensors and the like. For modulating loops, each output of one modulating loop may get assigned to one UIO terminal. For floating loops, each output of one floating loop may get assigned to two DO terminals, as floating often needs two binary terminals to control open and close. The application exposes floating motor properties as part of the output configuration, which can include one or more of runtime, hysteresis, sync power up, sync repeat time, sync repeat count and the like. For PWM, each output of each PWM loop may get assigned to one DO terminal. The application may expose PWM properties as part of the output configuration, which can include pulse width, period, zero time, full time and the like.

Digital control can use, for example, occupancy sensor, push button, override on, override off and schedule to command the output. During scheduled-on hours, the output may be commanded on. Whenever the schedule is off, the output may be commanded on based on occupancy sensor input (which has the third highest priority). The user can further command the output on from a push button input, which has the second highest priority. The push button can be configured as an on/off button or a push button with a timer. The override on can be used to command on and override off can be used to command off, and has the highest priority. For staging control, the staging control may use a sensor value from a UIO terminal and a setpoint from a configured software point to control the stages of an equipment. In one example, a maximum of three (3) stages are supported, i.e., commanding a maximum of three (3) digital outputs.

A monitoring loop may be used to monitor any analog or digital sensors or points data. These inputs points may be exposed in the network. When the user selects the equipment as monitoring, the application may progressively show only input configurations by hiding output and loop parameters configuration as they are not applicable for monitoring. Once the user chooses analog or digital, the application further prompts for the type of sensor or what it is measuring. Sensor types that can be added as inputs include, for example, occupancy sensors, motion sensors, passive infrared (PIR) sensors, temperature sensors, carbon dioxide sensors, humidity sensors, light sensors, air pressure sensors, VOC (volatile organic compounds) sensors, water level sensors, helium sensors and the like.

For each of the control loops, the application may expose properties of output configuration such as but not limited to polarity, alarm settings, IO terminal, point display name, IO characteristics, trend settings and the like. The application may progressively exposes properties of input configuration (both for control and monitor loops) in which user can choose to add any input from the list—Eg: Occupancy Sensor, Custom Sensor, Loop disable etc. based on loop. User can even add multiple inputs. For each input, the illustrative application allows configuration to be set which includes alarm settings, IO terminal, IO Characteristics, point display name, Trend settings. The application progressively exposes Loop parameters like Throttling range, Integral time, derivative time, Occupancy sensor offset delay and Schedule setpoints etc. based on the loop. The application may then validate to ensure the number of equipment's of each type created do not exceed the number of corresponding loops supported in application. As and when the user selects inputs and outputs, the application assigns the default IO terminals and provides a flexibility to change the terminal assignment.

As per the above process, when the user configures equipment parameters, the application may map those parameters to corresponding loop's input/output/loop parameters. Each parameter that is exposed to a terminal may have a mapping to an object based on the protocol supported by the building controller. For example, if the building controller is a BACnet device, then the parameter is mapped to a BACnet Object, if the building controller is a MQTT device, then the parameter may be mapped to a topic/message id, etc. As a user changes parameter values, the application may fetch/push mapped objects (points in case of BACnet, Topics in case of MQTT) accordingly.

Figure 3:
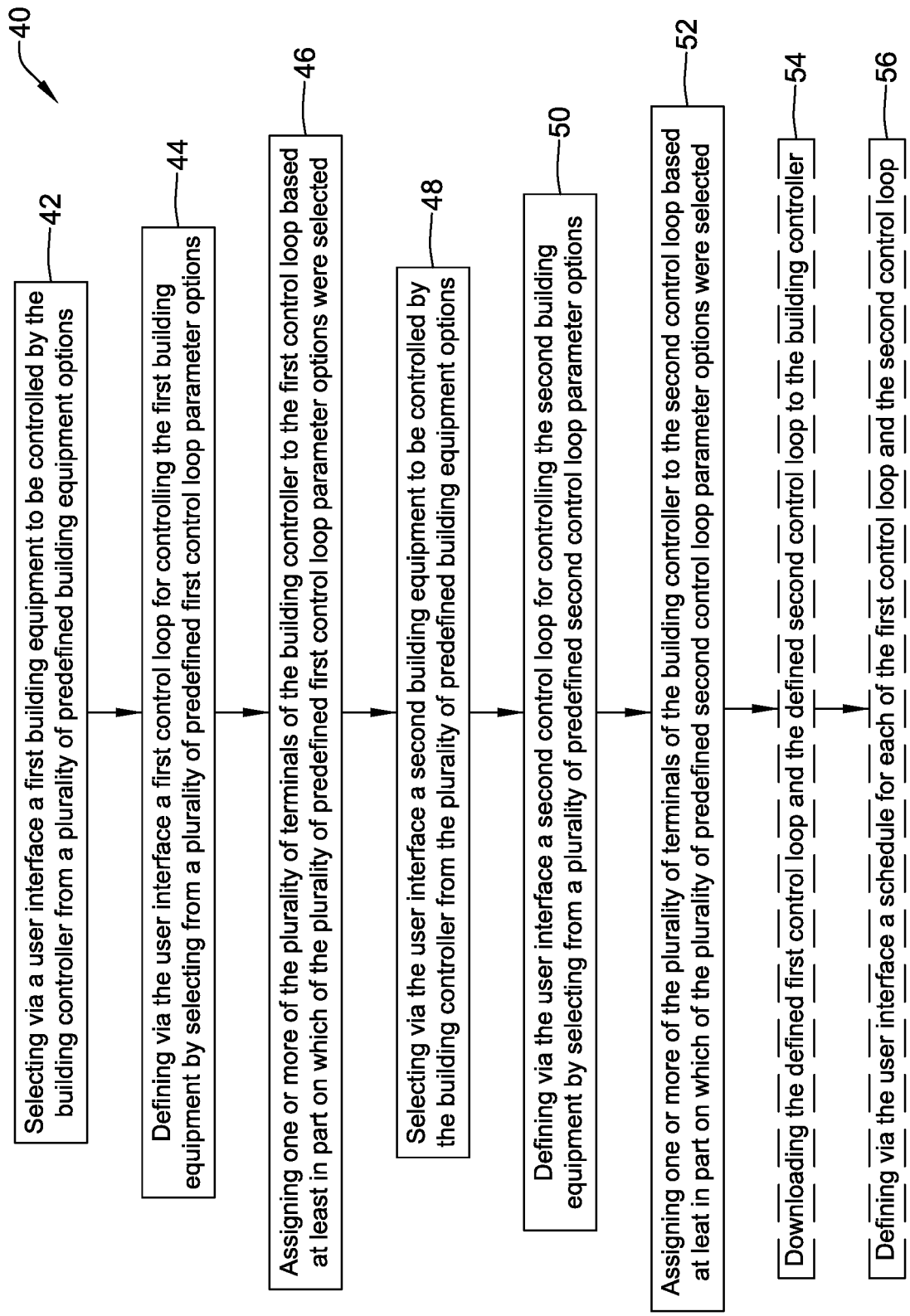
FIG. 3 is a flow diagram showing an illustrative method of programming a building controller such as the illustrative building controller of FIG. 2.

FIG. 3 is a flow diagram showing an illustrative method 40 of programming a building controller (such as the building controller 14) to control building equipment of a building (such as the building equipment components 12), where the building controller has a plurality of terminals. A first building equipment to be controlled by the building controller is selected via a user interface (such as the user interface 20) from a plurality of predefined building equipment options, as indicated at block 42. The user interface may be part of a mobile device, for example. In some cases, the building controller may be wall-mountable, with the plurality of terminals fixed. Each of the terminals may be configured to be coupled to a wire that is connected to a corresponding building equipment.

A first control loop for controlling the first building equipment is defined via the user interface by selecting from a plurality of predefined first control loop parameter options, as indicated at block 44. One or more of the plurality of terminals of the building controller are assigned to the first control loop based at least in part on which of the plurality of predefined first control loop parameter options were selected, as indicated at block 46. A second building equipment to be controlled by the building controller is selected via the user interface from the plurality of predefined building equipment options, as indicated at block 48. A second control loop is defined via the user interface for controlling the second building equipment by selecting from a plurality of predefined second control loop parameter options, as indicated at block 50. One or more of the plurality of terminals of the building controller are assigned to the second control loop based at least in part on which of the plurality of predefined second control loop parameter options were selected, as indicated at block 52.

In some instances, the one or more of the plurality of terminals that are assigned to the second control loop include at least one terminal that is different from the one or more of the plurality of terminals that are assigned to the first control loop. In some instances, the plurality of terminals include one or more universal IO (UIO) terminals that are configurable to be one of an analog input terminal, a digital input terminal, analog output terminal and a digital output terminal, one or more digital input (DI) terminals and one or more digital output (DO) terminals. In some instances, one or more of the plurality of predefined first control loop parameter options specifies a type of input terminal and/or a type of output terminal for use by the first control loop and one or more of the plurality of predefined first control loop parameter options specifies a type of input terminal and/or a type of output terminal for use by the second control loop. The first control loop may share at least one terminal with the second control loop. In some cases, the first control loop does not share any terminals with the second control loop.

The plurality of predefined first control loop parameter options may include a control loop type option, wherein the control loop type option is selectable from two or more of modulating control, floating control, pulse width modulating control, digital control, staging control and monitoring. In some cases, at least some of the plurality of predefined first control loop parameter options may be dependent on the control loop type option that is selected. At least some of the plurality of predefined first control loop parameter options may be dependent on the first building equipment that is selected. The plurality of predefined first control loop parameter options includes an option to define one or more points for the first control loop. The one or more points for the first control loop may include a sensor input. One or more loop parameter options may include an option to define a control parameter of the first control loop, wherein the control parameter includes one or more of a throttle range, an integral time, a derivative time, an occupancy sensor offset delay and one or more schedule set points.

In some cases, and as optionally indicated at block 54, control parameters for the defined first control loop and the defined second control loop may be downloaded to the building controller. In some cases, the control parameters may be considered as being exposed as BACnet points. As each parameter value is selected, a corresponding BACnet point holds that value. During download, all of the BACnet points are written to the controller. In some instances, and as optionally indicated at block 56, a schedule for each of the first control loop and the second control loop may be defined via the user interface.

Figure 4:
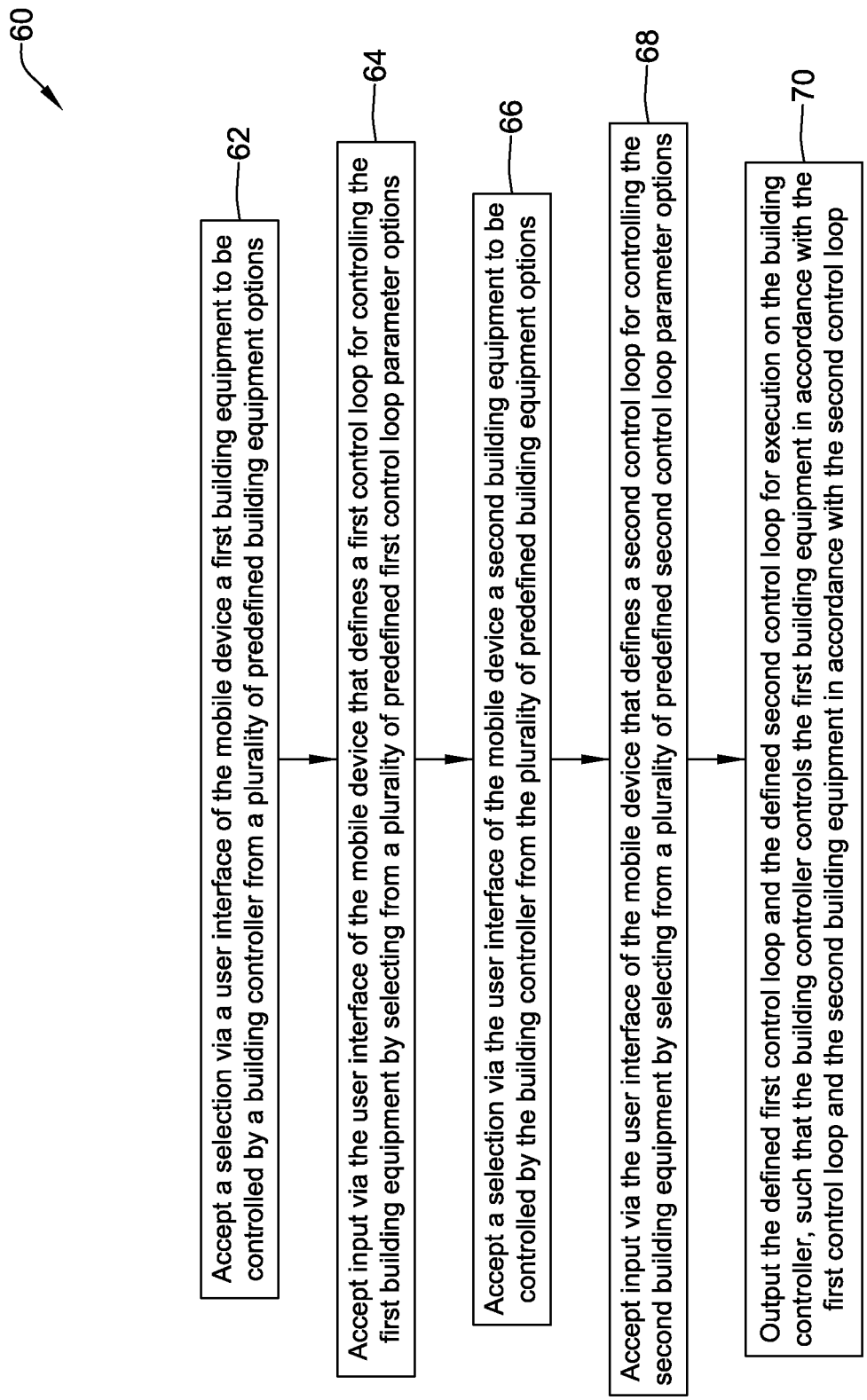
FIG. 4 is a flow diagram showing an illustrative method of programming a building controller such as the illustrative building controller of FIG. 2.

FIG. 4 is a flow diagram showing an illustrative method 60 that may be carried out. A selection is accepted via a user interface of the mobile device a first building equipment to be controlled by a building controller from a plurality of predefined building equipment options, as indicated at block 62. Input is accepted via the user interface of the mobile device that defines a first control loop for controlling the first building equipment by selecting from a plurality of predefined first control loop parameter options, as indicated at block 64. A selection is accepted via the user interface of the mobile device a second building equipment to be controlled by the building controller from the plurality of predefined building equipment options, as indicated at block 66. Input is accepted via the user interface of the mobile device that defines a second control loop for controlling the second building equipment by selecting from a plurality of predefined second control loop parameter options, as indicated at block 68. The defined first control loop and the defined second control loop are outputted for execution on the building controller, such that the building controller controls the first building equipment in accordance with the first control loop and the second building equipment in accordance with the second control loop, as indicated at block 70. In some cases, one or more of a plurality of terminals of the building controller are assigned to the first control loop based at least in part on which of the plurality of predefined first control loop parameter options were selected and one or more of the plurality of terminals of the building controller are assigned to the second control loop based at least in part on which of the plurality of predefined second control loop parameter options were selected.

Figure 5:
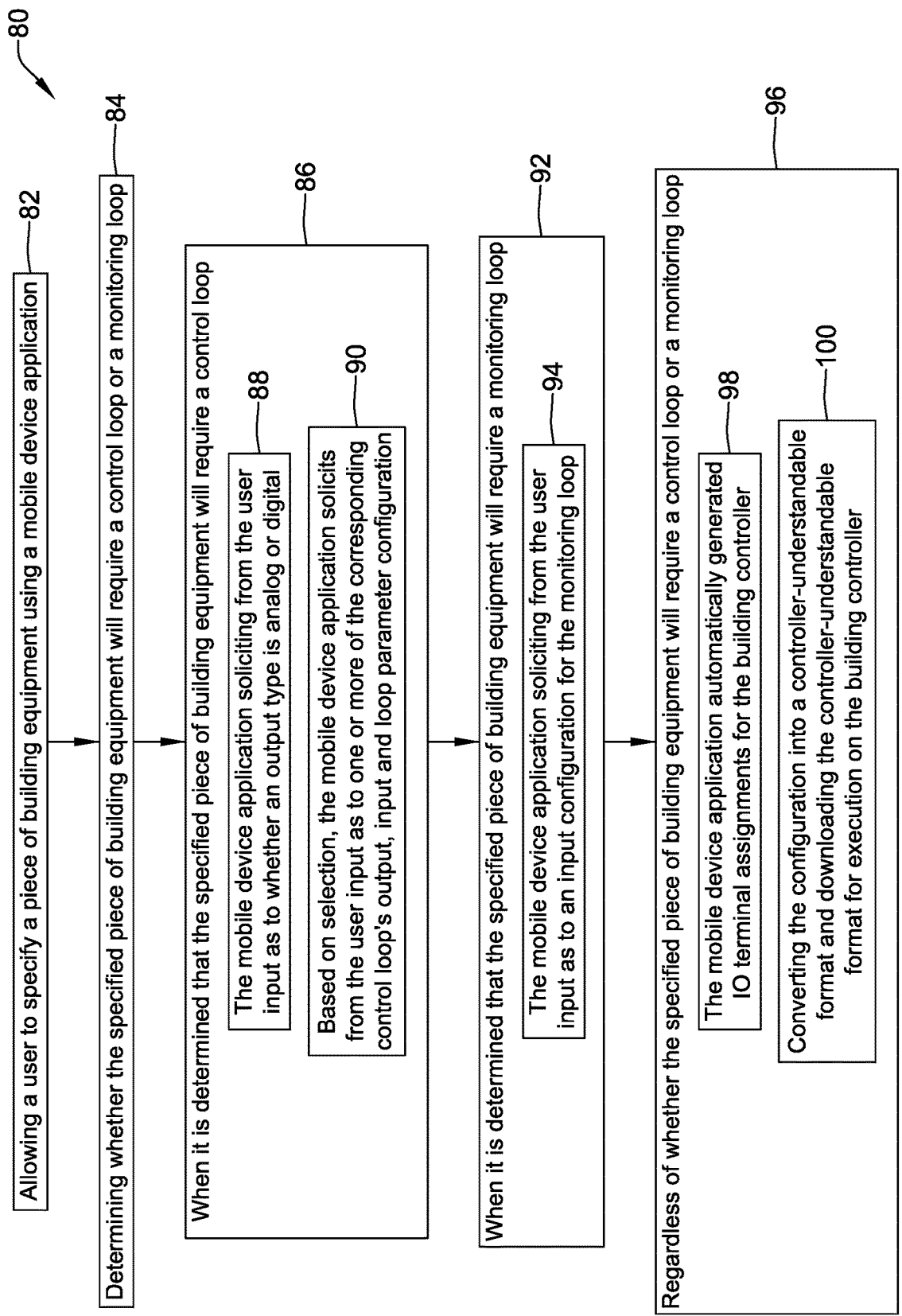
FIG. 5 is a flow diagram showing an illustrative method of configuring a controller application that may execute on a building controller such as the illustrative building controller of FIG. 2; and, FIGS. 6 through 29 show screen captures of screens displayable on a mobile device when programming the illustrative building controller of FIG. 2.

FIG. 5 is a flow diagram showing an illustrative method 80 of configuring a controller application (such as the application 28) that will execute on a building controller (such as the building controller 14) in order to control a building equipment (such as the building equipment components 12), the controller application when executing causing the building controller to receive one or more inputs from some of a plurality of terminals of the building controller and to create and output one or more outputs via one or more of the other of the plurality of terminals of the building controller, the controller application customizable to execute on any of a variety of different building controllers and/or to control any of a variety of different building equipment. A user is allowed to specify a piece of building equipment using a mobile device application, as indicated at block 82. A determination is made whether the specified piece of building equipment will require a control loop or a monitoring loop, as indicated at block 84. When it is determined that the specified piece of building equipment will require a control loop, and as indicated at block 86, the mobile device application solicits from the user input as to whether an output type is analog or digital, as indicated at block 88, and based on selection, the mobile device application solicits from user input as to one or more of the corresponding control loop's output, input and loop parameter configuration, as indicated at block 90.

When it is determined that the specified piece of building equipment will require a monitoring loop, as indicated at block 92, the mobile device application may solicit from the user input as to an input configuration for the monitoring loop, as indicated at block 94. Regardless of whether the specified piece of building equipment will require a control loop or a monitoring loop, and as indicated at block 96, the mobile device application automatically generates IO terminal assignments for the building controller, as indicated at block 98, and converts the configuration into a controller-understandable format and downloading the controller-understandable format for execution on the building controller, as indicated at block 100. In some cases, regardless of whether the specified piece of building equipment will require a control loop or a monitoring loop, the mobile device application may solicit information from the user regarding alarms.

FIGS. 6 through 29 provide example screen captures that are displayable on a mobile device such as the mobile device 18 when programming a building controller such as the building controller 14. It should be appreciated that these screen captures are only illustrative of one possible implementation of the disclosure. Not every screen capture needs to be provided, and the options and selections of the screen captures are only illustrative and may certainly be different depending on the particularly application and goals.

FIG. 6 shows a screen 120 that shows an example of a loop being exposed as equipment. The screen 120 includes a general button 122 and an equipment button 124. As can be seen, the equipment button 124 has been selected (is highlighted). As a result, the mobile device displays instructions 126 that help the user to understand what they should be doing as well as a number of equipment icons 128 including (as illustrated) an Exhaust Fan icon 128a, a VRF/VRV icon 128b, a Lighting icon 128c and an Others icon 128d. In some cases, the Others icon 128d may be selected in order to allow the user to flexibly configure non-standard equipment. The user is able to select one of the equipment icons 128 in order to configure the controller for that particular equipment. Each loop of the application is exposed as an equipment. As shown, the Lighting icon 128c has been selected (is highlighted).

As a result, the mobile device displays a screen 130 in which the user is able to select a function type for the lighting control loop. The screen 130 includes a Standard icon 132 and a Custom icon 134. As illustrated, the Standard icon 132 has been selected (is highlighted). As a result, the screen 130 includes a number of options 136 including an On/Off Control icon 136a, which provides a binary control option, a Dimming control icon 136b, which provides an analog control option, a Monitoring only icon 136c and a Custom icon 136d. As illustrated, the On/Off control icon 136a has been selected (is highlighted).

Figure 9:
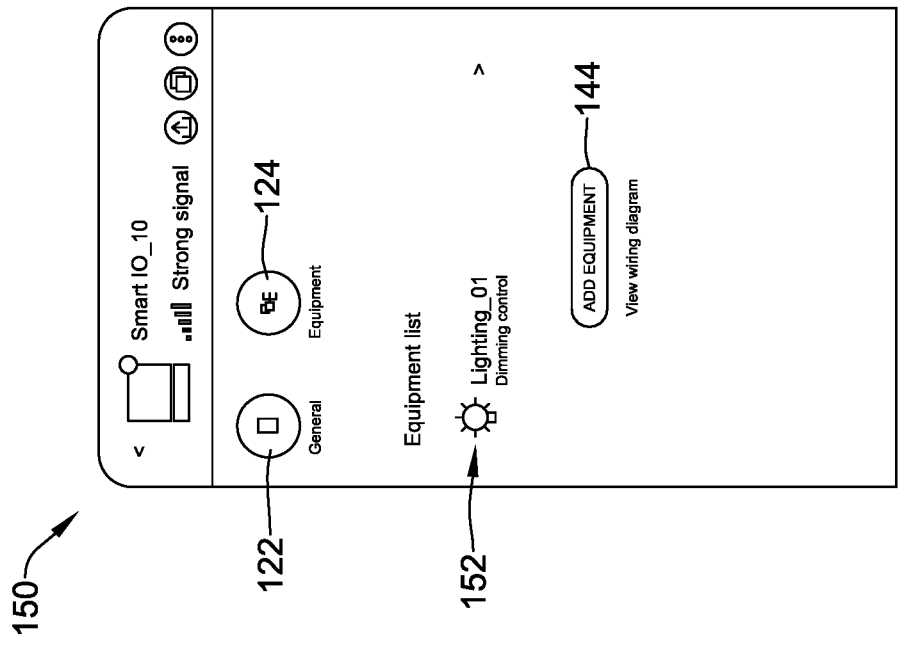
Figure 8:
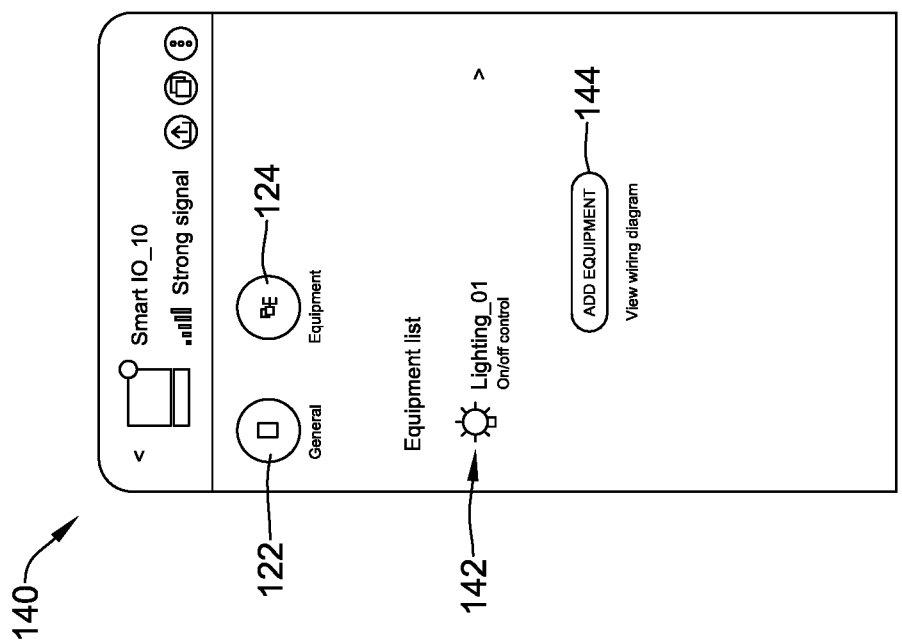

FIG. 8 shows a screen 140 that is displayed by the mobile device as a result of the user having selected the On/Off control icon 136a on the screen 130 of FIG. 7. The screen 140 includes a Lighting button (on/off control) 142 that may be selected to go to another screen in order to provide additional information. The screen 140 also provides the user with an option to view a wiring diagram if they desire. The screen 140 includes an Add Equipment button 144. If on screen 130 the user had instead selected the Dimming control icon 136b, the mobile device would display a screen 150 as shown in FIG. 9. The screen 150 includes a Lighting button (dimming control) 152 that may be selected to go to another screen in order to provide an additional information. The screen 150 also provides the user with an option to view a wiring diagram if they desire, as well as an Add Equipment button 144. If on screen 130 the user had instead selected the Monitoring only icon 136c, the mobile device would display a screen 160, as seen in FIG. 10. The screen 160 includes a Lighting button (monitoring control) 162 that may be selected to go to another screen in order to provide an additional information. The screen 160 also provides the user with an option to view a wiring diagram if they desire, as well as an Add Equipment button 144.

Returning briefly to FIG. 8, if the user selects the Lighting button (on/off control) 142, the mobile device displays a screen 170, as shown in FIG. 11. The screen 170 includes an indicator 172 that provides the user with a reminder of the equipment they are currently configuring. The screen 170 includes a Zone button 174, a Lighting control button 176 and a Point Configuration button 178. As can be seen, no points have been added yet. If the user selects the Lighting control button 176, the mobile device displays a screen 180, as shown in FIG. 12, which allows the user to configure output control. An indicator 182 provides the user with a reminder of where they are in the menu hierarchy. The screen 180 includes a control type button 184, which can be toggled between normally open and normally closed. The screen 180 includes a sensor interlock button 186, which can be toggled between enabled (as shown) and disabled.

The screen 180 also displays options for alarms, including an Alarm button 188 that can be toggled between enabled (as shown) and disabled. An alarm display button 190 displays the current alarm name while a button 192 enables the user to select the alarm value, which can be toggled between On (as shown) or off. A severity button 194 allows the user to specify the alarm severity, choosing between a Low severity alarm, a Medium severity alarm and a High severity alarm.

Returning briefly to FIG. 11, the screen 170 includes an Advanced configuration button 179, which when selected causes the mobile device to display a screen 200 shown in FIG. 13. The screen 200 provides the user with an opportunity to configure the loop control. The screen 200 includes an indicator 202 that provides the user with a reminder of the equipment they are currently configuring. The screen 200 displays an override timer button 204 that displays a current value for an override timer.

Returning briefly to FIG. 11, if the user selects the Point Configuration button 178, the mobile device displays a screen 210 as shown in FIG. 14. The screen 210 is similar to the screen 170, but an Available Points box 212 has been superimposed over a lower portion of the screen 170. The Available Points box 212 includes a number of options, including an Occupancy sensor 212*a*, an Override on 212*b*, a Lighting sensor 212*c*, a Push button 212*d* and an Override off 212*e*. This allows the user to choose inputs to add. The input list that is displayed in the Available Points box 212 may vary depending on the control type previously chosen. If the user selects Occupancy sensor 212*a*, the mobile device displays a screen 220 as shown in FIG. 15.

The screen 220 includes an Occupancy sensor button 222 that may be selected to cause the mobile device to display an additional screen to provide additional information regarding an occupancy sensor. The screen 220 also includes a Push button 224 that indicates that the alarm is currently disabled. In some cases, this is a default alarm configuration. An Add Points button 226 may be used to revert to a screen such as the screen 210. The screen 220 also includes a Delete equipment button 228 that allows a user to remove a piece of equipment that was added in error, for example, or whose configuration includes one or more errors. If the user selects the Occupancy sensor button 222 on screen 220, the mobile device displays a screen 230, as shown in FIG. 16.

The screen 230 includes an indicator 232 that provides the user with a reminder of the equipment they are currently configuring. In some cases, when configuring points, the user can select between using an existing point that was already created and configured for another control loop/equipment instead of creating a new input point. The screen 230 includes a New/Existing button 234 that may be toggled between configuring a new point (as shown) and using an existing point. For example, an existing point corresponding to an occupancy sensor may already have been created for another control loop, and that same occupancy sensor point may be used in the control loop now being configured. The screen 230 also includes a control type button 236 that can be toggled between normally open (as shown) and normally closed. A contact type button 238 can be toggled between dry contact (as shown) and external voltage. A sensor off delay button 240 displays a current value for the sensor off delay. An alarm button 242 can be toggled between enabled and disabled (as shown).

If on the screen 230 the user toggles to using an existing point, the mobile device will display a screen 250, as shown in FIG. 17. The screen 250 includes an indicator 252 that provides the user with a reminder of the equipment they are currently configuring. A sensor name button 254 shows that the user is using a point that was configured for a temperature sensor input. An alarm button 256 can be toggled between enabled and disabled (as shown).

Returning briefly to FIG. 15, if the user selects the Push button 224, the mobile device displays a screen 260. The screen 260 includes an indicator 262 that provides the user with a reminder of the equipment they are currently configuring. The screen 260 includes a control type button 264 that can be toggled between normally open (as shown) and normally closed. A contact type button 266 can be toggled between dry contact (as shown) and external voltage. A push button type button 268 can be toggled between On/Off, Start/Stop and Start/Reset (as shown). An Alarm button 270 can be toggled between enabled and disabled (as shown).

Returning briefly to FIG. 9, if the user selects the Lighting button (dimming control) 152 on the screen 150, the mobile device will display a screen 280 as shown in FIG. 19. The screen 280 includes an indicator 282 that provides the user with a reminder of the equipment they are currently configuring. The screen 280 includes a zone button 284, a lighting control button 286 and a control sensor button 288. The screen 280 includes an add points button 226, a delete equipment button 228 and an advanced configuration button 290. Selecting the lighting control button 286 will cause the mobile device to display a screen 300 as shown in FIG. 20.

The screen 300 includes an indicator 302 that provides the user with a reminder of the equipment they are currently configuring. In the screen 300, binary output and control sensors may be automatically created from a template. The screen 300 includes a Variant button 304, a Sensor Interlock button 306 that can be toggled between enabled (as shown) and disabled, an Alarm button 308 that can be toggled between enabled (as shown) and disabled, an Alarm display name icon 310, an alarm button 312 that can be toggled between On (as shown) and Off and a Severity button 314 that can be toggled between a low severity alarm, a medium severity alarm and a high severity alarm (as indicated). If the user selects the Variant button 304, the mobile device displays a screen 320, as shown in FIG. 21.

The screen 320 is similar to the screen 300, but includes a Select Variant box 322 superimposed over the screen 300. The Select Variant box 322 allows the user to select between Direct, Reverse and Others. As shown, the user has selected 0-10 volts Direct. In some cases, the screen 320 allows the user to choose and change output device variants from a contextual set of options. For example, the only variants displayed for lighting equipment are variants that are applicable to lighting equipment.

Returning briefly to FIG. 19, if the user selects the Advanced configuration button 290, the mobile device will display a screen 330, as shown in FIG. 22. This enables the user to configure loop control. The screen 330 includes an indicator 332 that provides the user with a reminder of the equipment they are currently configuring. The screen 330 includes a push button timer button 334 and a set of PID configuration parameters 336 that allow a user to adjust throttling control and one or more of Proportional (P), Integral (I) and Derivative (D) parameters for PID control.

Returning briefly to FIG. 19, if the user selects the Control Sensor button 288, the mobile device displays a screen 340, as shown in FIG. 23, that allows the user to configure the control sensor input using by creating a new point (as shown) or using an existing point, as indicated by a button 344. The screen 340 includes an indicator 342 that provides the user with a reminder of the equipment they are currently configuring. The screen 340 includes a Variant button 346 displaying temperature, a Model button 348, an occupied setpoint temperature 350, a standby setpoint temperature 352, an unoccupied setpoint temperature 354 and an alarm button 356 that can be toggled between enabled and disabled (as indicated).

Returning again to FIG. 19, if the user selects the Add Points button 226, the mobile device displays a screen 360, as shown in FIG. 24. The screen 360 is similar to the screen 280 shown in FIG. 19, but includes an Available Point Types box 362 that is superimposed over the screen 280. The Available Point Types box 362 includes an Occupancy sensor button 364 and a Terminal disable button 366.

Returning briefly to FIG. 10, if the user selects the Lighting button (monitoring control) 162, the mobile device displays a screen 370, as shown in FIG. 25. The screen 370 includes an indicator 372 that provides the user with a reminder of the equipment they are currently configuring. The screen 370 includes a zone button 374 and a Monitoring sensor button 376. If the user selects the Monitoring sensor button 376, the mobile device displays a screen 380, as shown in FIG. 26.

The screen 380 includes an indicator 382 that provides the user with a reminder of the equipment they are currently configuring. The screen 380 includes Sensor Type button 384 that can be toggled between Digital (as shown), Analog and Pulse. The screen 380 includes a Control Type button 386 that can be toggled between Normally Open (as shown) and Normally Closed. A Contact type button 388 can be toggled between Dry contact (as shown) and External voltage. An Alarm button can be toggled between enabled and disabled (as shown).

FIG. 27 shows a screen 400 that shows default schedules for each piece of equipment that has been configured. The screen 400 includes an indicator 402 that that provides the user with a reminder of the equipment they are currently configuring. The screen 400 includes a Lobby RTU schedule button 404, a Conf1 RTU schedule button 406, a Lobby lighting schedule button 408, an Indoor lighting schedule button 410 and an Outdoor lighting schedule button 412. Selecting any of these buttons 404, 406, 408, 410, 412 will cause the mobile device to display a screen that provides additional details regarding that particular schedule. If, for example, the user selects the Outdoor lighting schedule button 412, the mobile device will display a screen 420, as shown in FIG. 28.

The screen 420 includes an indicator 422 that provides the user with a reminder of the equipment they are currently configuring. The screen 420 includes an equipment button 424 and a weekly schedule region 426 that may be used to display information and/or to edit the weekly schedule.

FIG. 29 shows a screen 430 that is similar to the screen 420, but shows an option to delete schedules that they do not want as well as to copy events from one equipment schedule to another. As illustrated, the screen 430 includes a Copy button 432 and a Delete button 434 superimposed over the Indoor lighting schedule button 410.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of programming a building controller to control building equipment of a building, the building controller having a plurality of terminals, the method comprising:
   selecting via a user interface a first building equipment to be controlled by the building controller from a plurality of predefined building equipment options;
   defining via the user interface a first control loop for controlling the first building equipment by selecting from a plurality of predefined first control loop parameter options, wherein one or more of the plurality of predefined first control loop parameter options includes an option to define a control parameter of the first control loop, wherein the control parameter includes one or more of: a throttle range, an integral time, a derivative time, an occupancy sensor offset delay and one or more schedule set points;
   assigning one or more of the plurality of terminals of the building controller to the first control loop based at least in part on which of the plurality of predefined first control loop parameter options were selected;
   selecting via the user interface a second building equipment to be controlled by the building controller from the plurality of predefined building equipment options;
   defining via the user interface a second control loop for controlling the second building equipment by selecting from a plurality of predefined second control loop parameter options;
   assigning one or more of the plurality of terminals of the building controller to the second control loop based at least in part on which of the plurality of predefined second control loop parameter options were selected; and
   defining via the user interface a first schedule for the first control loop and defining via the user interface a second schedule for the second control loop.

2. The method of claim 1, wherein the user interface is part of a mobile device.

3. The method of claim 1, further comprising downloading control loop parameters for the defined first control loop and the defined second control loop to the building controller.

4. The method of claim 1, wherein the one or more of the plurality of terminals assigned to the second control loop include at least one terminal that is different from the one or more of the plurality of terminals assigned to the first control loop.

5. The method of claim 1, wherein the building controller is wall mountable and the plurality of terminals are fixed, and each terminal is configured to be coupled to a wire that is connected to a corresponding building equipment.

6. The method of claim 1, wherein the plurality of terminals include:

one or more universal IO (UIO) terminals that are configurable to be one of an analog input terminal, a digital input terminal, analog output terminal and a digital output terminal;
one or more digital input (DI) terminals; and
one or more digital output (DO) terminals.

7. The method of claim 6, wherein:
one or more of the plurality of predefined first control loop parameter options specifies a type of input terminal and/or a type of output terminal for use by the first control loop; and
one or more of the plurality of predefined second control loop parameter options specifies a type of input terminal and/or a type of output terminal for use by the second control loop.

8. The method of claim 7, wherein the first control loop shares at least one terminal with the second control loop.

9. The method of claim 7, wherein the first control loop does not share any terminals with the second control loop.

10. The method of claim 1, wherein the plurality of predefined first control loop parameter options include a control loop type option, wherein the control loop type option is selectable from two or more of:
modulating control;
floating control;
pulse width modulating control;
digital control;
staging control; and
monitoring.

11. The method of claim 10, wherein at least some of the plurality of predefined first control loop parameter options are dependent on the control loop type option that is selected.

12. The method of claim 1, wherein at least some of the plurality of predefined first control loop parameter options are dependent on the first building equipment that is selected.

13. The method of claim 1, wherein one or more of the plurality of predefined first control loop parameter options includes an option to define one or more points for the first control loop.

14. The method of claim 13, wherein the one or more points for the first control loop include a sensor input.

15. A non-transient, computer-readable storage medium having stored thereon instructions that when executed by one or more processors of a mobile device, cause the one or more processors of the mobile device to:
accept a selection via a user interface of the mobile device a building equipment type selected from an HVAC (Heating, Ventilating and Air Conditioning) equipment type and a lighting equipment type;
accept a selection via the user interface of the mobile device a first building equipment of the selected building equipment type to be controlled by a building controller from a plurality of predefined building equipment options for the selected building equipment type;
accept input via the user interface of the mobile device that defines a first control loop for controlling the first building equipment by selecting from a plurality of predefined first control loop parameter options, wherein one or more of the plurality of predefined first control loop parameter options includes an option to define a control parameter of the first control loop, wherein the control parameter includes one or more of: a throttle range, an integral time, a derivative time, an occupancy sensor offset delay and one or more set points;
accept a selection via the user interface of the mobile device a second building equipment of the selected building equipment type to be controlled by the building controller from the plurality of predefined building equipment options for the selected building equipment type;
accept input via the user interface of the mobile device that defines a second control loop for controlling the second building equipment by selecting from a plurality of predefined second control loop parameter options; and
output the defined first control loop and the defined second control loop for execution on the building controller, such that the building controller controls the first building equipment in accordance with the first control loop and the second building equipment in accordance with the second control loop.

16. The non-transient, computer-readable storage medium of claim 15, including instructions that when executed by one or more processors of the mobile device, cause the one or more processors of the mobile device to:
assign one or more of a plurality of terminals of the building controller to the first control loop based at least in part on which of the plurality of predefined first control loop parameter options were selected; and
assign one or more of the plurality of terminals of the building controller to the second control loop based at least in part on which of the plurality of predefined second control loop parameter options were selected.

17. A method of configuring a controller application that will execute on a building controller in order to control a building equipment, the controller application when executing causing the building controller to receive one or more inputs from some of a plurality of terminals of the building controller and to create and output one or more outputs via one or more of the other of the plurality of terminals of the building controller, the controller application customizable to execute on any of a variety of different building controllers and/or to control any of a variety of different building equipment, the method comprising:
allowing a user to specify a piece of building equipment using a mobile device application;
determining whether the specified piece of building equipment will require a control loop or a monitoring loop;
when it is determined that the specified piece of building equipment will require a control loop:
the mobile device application soliciting from the user input as to whether an output type is analog or digital;
based on selection, the mobile device application solicits from the user input for each of the corresponding control loop's output, input and loop parameter configuration, wherein the loop parameter configuration includes one or more of: a throttle range, an integral time, a derivative time, an occupancy sensor offset delay and one or more set points;
when it is determined that the specified piece of building equipment will require a monitoring loop:
the mobile device application soliciting from the user input as to an input configuration for the monitoring loop;
regardless of whether the specified piece of building equipment will require a control loop or a monitoring loop:
the mobile device application automatically generated IO terminal assignments for the building controller;

converting the configuration into a controller-understandable format and downloading the controller-understandable format for execution on the building controller; and soliciting information from the user regarding alarms for one or more of the control loop and monitoring loop.

* * * * *